United States Patent
Wetterwald et al.

(10) Patent No.: US 11,038,799 B2
(45) Date of Patent: Jun. 15, 2021

(54) PER-FLOW QUEUE MANAGEMENT IN A DETERMINISTIC NETWORK SWITCH BASED ON DETERMINISTICALLY TRANSMITTING NEWEST-RECEIVED PACKET INSTEAD OF QUEUED PACKET

(71) Applicant: Cisco Technology, Inc., San Jose, CA (US)

(72) Inventors: Patrick Wetterwald, Mouans Sartoux (FR); Eric Michel Levy-Abegnoli, Valbonne (FR); Pascal Thubert, Roquefort les Pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 39 days.

(21) Appl. No.: 16/516,836

(22) Filed: Jul. 19, 2019

(65) Prior Publication Data

US 2021/0021520 A1  Jan. 21, 2021

(51) Int. Cl.
| | |
|---|---|
| *G06F 9/38* | (2018.01) |
| *H04L 12/801* | (2013.01) |
| *H04L 12/863* | (2013.01) |
| *H04L 12/26* | (2006.01) |
| *H04L 12/823* | (2013.01) |
| *H04L 12/947* | (2013.01) |

(52) U.S. Cl.
CPC .............. *H04L 47/12* (2013.01); *H04L 43/16* (2013.01); *H04L 47/323* (2013.01); *H04L 47/6215* (2013.01); *H04L 49/25* (2013.01)

(58) Field of Classification Search
CPC ... H04L 47/6215; H04L 47/12; H04L 47/323; H04L 49/25; H04L 43/16
See application file for complete search history.

(56) References Cited

U.S. PATENT DOCUMENTS

| | | |
|---|---|---|
| 8,059,546 B2 | 11/2011 | Pai et al. |
| 8,072,910 B2 | 12/2011 | Thubert et al. |
| 8,243,734 B1 | 8/2012 | Deters et al. |
| 8,407,707 B2 | 3/2013 | Sonnier et al. |
| 8,520,520 B2 | 8/2013 | Moore et al. |
| 8,861,344 B2 | 10/2014 | Trinh et al. |

(Continued)

OTHER PUBLICATIONS

IEC, "62439-3 Ed.2.0: Industrial communication networks—High availability automation networks—Part 3: Parallel Redundancy Protocol (PRP) and High-availability Seamless Redundancy (HSR)", 2012, pp. 1-84.

(Continued)

*Primary Examiner* — Wei Zhao
(74) *Attorney, Agent, or Firm* — Leon R. Turkevich (57) ABSTRACT

In one embodiment, a method comprises: receiving, by a switching device in a deterministic network, a first data packet associated with an identified flow of data packets, and queuing the first data packet for deterministic transmission at a deterministic transmit instance to a next-hop device in the deterministic network; detecting, by the switching device, reception of a newest data packet associated with the identified flow and before the deterministic transmission of the first data packet; and prioritizing for the identified flow, by the switching device, the newest data packet based on deterministically transmitting, at the deterministic transmit instance, the newest data packet instead of the first data packet.

18 Claims, 5 Drawing Sheets

(56) References Cited

U.S. PATENT DOCUMENTS

| | | | |
|---|---|---|---|
| 9,019,824 B2 | 4/2015 | Thubert et al. | |
| 2018/0176144 A1* | 6/2018 | Luo | H04L 47/56 |
| 2019/0109797 A1 | 4/2019 | Thubert et al. | |
| 2019/0116000 A1 | 4/2019 | Thubert et al. | |
| 2019/0124006 A1 | 4/2019 | Thubert et al. | |
| 2019/0132253 A1 | 5/2019 | Thubert et al. | |
| 2019/0303159 A1* | 10/2019 | Fryman | G06F 9/3881 |
| 2020/0126172 A1* | 4/2020 | Vanslette | G06Q 50/163 |

OTHER PUBLICATIONS

BROADCOM, "BCM53570 1G/2.5G/10G/25G TSN Connectivity Switch", Product Brief, [online], [retrieved on Jul. 9, 2018]. Retrieved from the Internet: URL: <https://docs.broadcom.com/docs/53570-PB101>, 2 pages.

AVNU Alliance, "AVNU", 2018, [online], [retrieved on Jul. 9, 2018]. Retrieved from the Internet: URL: <http://avnu.org/>, pp. 1-2.

Cisco, "Parallel Redundancy Protocol (PRP) for IE 4000, IE 4010, and IE 5000 Switches", Jun. 26, 2018, [online], [retrieved on Jul. 9, 2018]. Retrieved from the Internet: URL: <https://www.cisco.com/c/en/us/td/docs/switches/lan/industrial/software/configuration/guide/b_prp_ie4k_5k.pdf>, pp. 1-28.

IETF Datatracker, "Deterministic Networking (detnet)", Jul. 5, 2018, [online], [retrieved on Jul. 9, 2018]. Retrieved from the Internet: URL: <https://datatracker.ietf.org/wg/detnet/about/>, pp. 1-4.

Farkas, "TSN Basic Concepts", DetNet TSN workshop, Nov. 11, 2018, [online], [retrieved on Mar. 28, 2019]. Retrieved from the Internet: URL: <http://www.ieee802.org/1/files/public/docs2018/detnet-tsn-farkas-tsn-basic-concepts-1118-v01.pdf>, pp. 1-20.

Varga, Ed., et al., "DetNet Data Plane: IP", DetNet Internet Draft, Jul. 1, 2019, [online], [retrieved on Jul. 5, 2019]. Retrieved from the Internet: URL: <https://tools.ietf.org/pdf/draft-ietf-detnet-ip-01.pdf>, pp. 1-22.

Finn, "Time-sensitive and Deterministic Networking Whitepaper", Jul. 11, 2017, [online], [retrieved on Aug. 24, 2018]. Retrieved from the Internet: URL: <https://mentor.ieee.org/802.24/dcn/17/24-17-0020-00-sgtg-contribution-time-sensitive-and-deterministic-networking-whitepaper.pdf>, pp. 1-24.

IEEE 802.1 Time-Sensitive Networking Task Group "Time-Sensitive Networking Task Group", May 3, 2017, [online], [retrieved on Jul. 9, 2018]. Retrieved from the Internet: URL: <http://www.ieee802.org/1/pages/tsn.html>, pp. 1-4.

Industrial Internet Consortium, "Smart Printing Factory", 2018, [online], [retrieved on Jul. 9, 2018]. Retrieved from the Internet: URL: <https://www.iiconsortium.org/>, pp. 1-5.

Lakshman et al., "The Drop from Front Strategy in TCP and in TCP over ATM", 1996 IEEE, [online], [retrieved om Mar. 28, 2019]. Retrieved from the Internet: URL: <http://www.cs.tut.fi/~kucherya/book/lakshman96.pdf>, pp. 1242-1250.

OPC Foundation, "Unified Architecture", 2018, [online], [retrieved on Jul. 9, 2018]. Retrieved from the Internet: URL: <https://opcfoundation.org/about/opc-technologies/opc-ua/>, pp. 1-3.

\* cited by examiner

PER-FLOW QUEUE MANAGEMENT IN A DETERMINISTIC NETWORK SWITCH BASED ON DETERMINISTICALLY TRANSMITTING NEWEST-RECEIVED PACKET INSTEAD OF QUEUED PACKET

TECHNICAL FIELD

The present disclosure generally relates to per-flow queue management in a deterministic network switch based on deterministically transmitting a newest-received packet instead of a queued packet.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) Deterministic Networking (DetNet) Working Group is addressing proposals for satisfying the stringent requirements of deterministic data networks (e.g., minimal jitter (i.e., minimal packet delay variation), low latency, minimal packet loss, and high reliability) that are implemented to guarantee the delivery of data packets within a bounded time. The DetNet Working Group is investigating proposals for networks that are under a single administrative control or within a closed group of administrative control, where such networks within the single/closed group of administrative control can provide forwarding along a multi-hop path with the deterministic properties of controlled latency, low packet low, low packet delay variation, and high reliability. One proposal for low power and lossy network (LLN) devices is a routing protocol that provides IPv6 routing using time slotted channel hopping (TSCH) based on IEEE 802.15.4e ("6TiSCH"), enabling wireless LLN devices to use low-power operation and channel hopping for higher reliability.

Deterministic transmission in wired networks can use time sensitive networking (TSN) and/or audio/video bridging (AVB) for deterministic networks such as professional and home audio/video, multimedia in transportation, vehicle engine control systems, and/or other general industrial and/or vehicular applications. Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

A particular problem, however, is that the requirements used to guarantee traffic delivery within a bounded time in a deterministic network (e.g., traffic policing, filtering, shaping, queuing, etc.) can be incompatible with requirements of previously-deployed data systems, for example serial communications systems that utilize a dedicated serial link for "real-time" transmission of the newest data packet generated by a source device. The replacement of multiple dedicated serial links with multiplexed connections (having respective identified flows) over a deterministic network can result in the deterministic requirements allocating an improper priority to the oldest queued data packet for an identified flow instead of the newest data packet in the identified flow.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: receiving, by a switching device in a deterministic network, a first data packet associated with an identified flow of data packets, and queuing the first data packet for deterministic transmission at a deterministic transmit instance to a next-hop device in the deterministic network; detecting, by the switching device, reception of a newest data packet associated with the identified flow and before the deterministic transmission of the first data packet; and prioritizing for the identified flow, by the switching device, the newest data packet based on deterministically transmitting, at the deterministic transmit instance, the newest data packet instead of the first data packet.

In another embodiment, an apparatus comprises non-transitory machine readable media, a device interface circuit, and a processor circuit. The non-transitory machine readable media is configured for storing executable machine readable code, and further comprises a queue for received data packets. The device interface circuit is configured for receiving a first data packet associated with an identified flow of data packets in a deterministic network. The processor circuit is configured for executing the machine readable code, and when executing the machine readable code operable for: queuing the first data packet in the queue for deterministic transmission at a deterministic transmit instance to a next-hop device in the deterministic network; detecting reception of a newest data packet associated with the identified flow and before the deterministic transmission of the first data packet; and prioritizing for the identified flow the newest data packet based on causing the device interface circuit to deterministically transmit, at the deterministic transmit instance, the newest data packet instead of the first data packet.

In another embodiment, one or more non-transitory tangible media encoded with logic for execution by a machine and when executed by the machine operable for: receiving, by the machine implemented as a switching device in a deterministic network, a first data packet associated with an identified flow of data packets, and queuing the first data packet for deterministic transmission at a deterministic transmit instance to a next-hop device in the deterministic network; detecting reception of a newest data packet associated with the identified flow and before the deterministic transmission of the first data packet; and prioritizing, for the identified flow, the newest data packet based on deterministically transmitting, at the deterministic transmit instance, the newest data packet instead of the first data packet.

DETAILED DESCRIPTION

Figure 1:
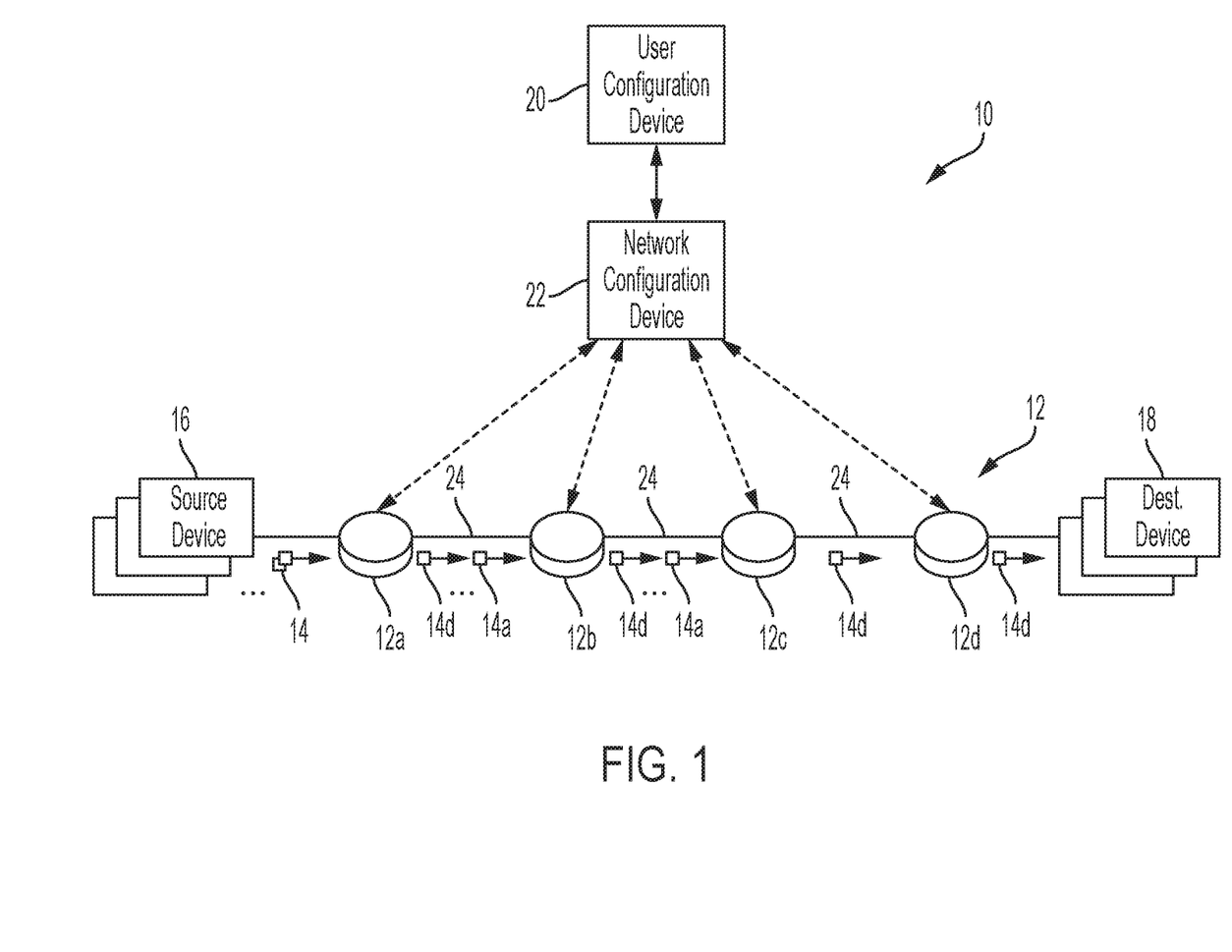
FIG. 1 illustrates an example system having an apparatus for prioritizing a newest data packet of an identified flow for deterministic transmission at a deterministic transmit instance, instead of another data packet of the identified flow and already queued for the deterministic transmission, according to an example embodiment.

FIG. 1 is a diagram illustrating an example deterministic data network 10 having deterministic switching devices 12 configured for deterministic transmission of data packets 14 from one or more source devices 16 to one or more destination devices 18, according to an example embodiment. The deterministic data network 10, implemented for example as a wired or wireless IEEE 802.1Qcc based TSN network, a Deterministic Ethernet network, an AVB network, a TSCH (e.g., wireless 6TiSCH) network, a DetNet network, a Deterministic Wireless network, etc., also can optionally include a user configuration device 20 and a network configuration device (i.e., network manager device) 22. Each apparatus 12, 16, 18, 20, and/or 22 is a physical machine (i.e., a hardware device) configured for implementing network communications with other physical machines 12, 16, 18, 20, and/or via the deterministic network 10. The term "configured for" or "configured to" as used herein with respect to a specified operation refers to a device and/or machine that is physically constructed and arranged to perform the specified operation.

Each deterministic switching device 12 can be implemented, for example, as a commercially-available Cisco® Industrial Ethernet (IE) 4000 Series and/or IE 5000 Series Switch from Cisco Systems, San Jose, Calif. Each deterministic switching device 12 can be configured, for example based on receiving instructions specifying deterministic constraints for implementing the deterministic data network 10.

In one embodiment ("fully centralized"), the instructions received by each deterministic switching device 12 can be generated by a network configuration device 22 and/or a user configuration device 20, where the network configuration device 22 can generate network configuration information based on user configuration policies supplied to the network configuration device 22 by the user configuration device 20. The network manager device 22, implemented for example as an orchestrator and/or a Path Computation Element (PCE), can be configured for establishing deterministic links 18 based on sending to each of the deterministic switching device 12 instructions specifying deterministic constraints established, for example, by the network manager device 22 based on user-selectable parameters provided by the user configuration device 20 (e.g., policy settings, flow identifier settings, etc.) including for example instructions for the prioritizing of a newest data packet for an identified flow.

In another embodiment ("centralized network and distributed user"), the network configuration device 22 can supply instructions, specifying the network configuration information and user configuration policies in the form of user and/or network configuration information, to each deterministic switching device 12; the network configuration device 22 also can communicate with each source device 16 and/or destination device 18, via one or more deterministic switching devices 12, for transmission and reception of the network configuration information and user configuration policies, including source-initiated policies where a source device 16 generates and sends, to the network configuration device 22 via a deterministic switching device 12, the required user configuration policies and/or network configuration information, including for example instructions for the prioritizing of a newest data packet for an identified flow.

In another embodiment ("fully distributed"), the instructions specifying the network configuration information and user configuration policies can be generated by one or more source devices 16 including for example instructions for the prioritizing of a newest data packet for an identified flow; hence, each deterministic switching device 12 receiving the instructions can store and implement the instructions, and forward the instructions (as appropriate) to a next-hop deterministic switching device 12 along a path to an identified destination device 18.

In one embodiment, at least a portion of the deterministic data network 10 can be implemented in a data center, where one or more deterministic switching device 12 can be implemented as a Top-of-Rack (TOR) Switch 28, implemented for example as a commercially-available Cisco® Catalyst 4900 Series Switch from Cisco Systems, San Jose, Calif. Hence, the devices 12, 16, 18 can be implemented within one or more rack mounts, for example within a data center or within an industrial network. The data links connecting the source devices 16 and the destination devices 18 to the deterministic switching devices 12 may or may not be deterministic links, depending on implementation.

Particular embodiments enable one or more switching devices 12 in the deterministic network 10 to prioritize deterministic transmission, on a per-flow basis, of a newest data packet (e.g., 14d) received by the one or more switching devices 12 and associated with a corresponding identified flow of data packets. As described in further detail below with respect to FIGS. 2, 4A-4B, a switching device (e.g., 12c) can transmit, to a next-hop device (e.g., 12d) in the deterministic network 10, the newest data packet (e.g., 14d) received by the switching device (e.g., 12c) for an identified flow at a deterministic transmit instance that was allocated for a queued data packet (e.g., 14a) associated with the identified flow and previously received by the switching device.

Hence, the example embodiments can optimize deterministic transmission of the "newest" data packets (e.g., 14d) generated by a source network device (e.g., a sensor device) 16, ensuring a destination device 18 can receive the newest data packet (e.g., 14d) for use by executable applications that require the newest data as opposed to a consistent stream of data packets in a prescribed sequence. The example embodiments can provide deterministic network transmission of "real-time" traffic flows that had previously relied on respective dedicated serial links for dedicated transmission of the newest data packet generated by a source device.

In particular, prior real-time traffic flows were generated based on a "buffered transmission" by a source device 16 comprising a physical sensor device, a digital buffer, and a serial read-and-transit device: the physical sensor device could regularly (e.g., periodically) generate a digital sensor value in response to measuring a physical property (e.g., temperature, pressure, velocity, pH value, etc.), and store the digital sensor value in the digital buffer during a "writing period"; the stored digital sensor value could be read from the digital buffer by the serial read-and-transmit device configured for reading the stored digital sensor value according to a "read period" independent and distinct from the writing period (i.e., the "writing period" and the "read period" could be asynchronous relative to each other); the serial read-and-transmit device further would be configured for packetizing the read digital sensor value obtained during the "read period" and transmitting the one or more data packets (comprising the read digital sensor value) onto a point-to-point serial data link for reception by a directly-connected receive device (e.g., 18). Hence, the receive device could receive the "newest" data packet, via the point-to-point serial data link, as soon as it was read and transmitted by the serial read-and-transmit device. This use of buffered transmission for real-time traffic flows, however, required a dedicated point-to-point serial data link for each stream of digital sensor values.

Figure 2:
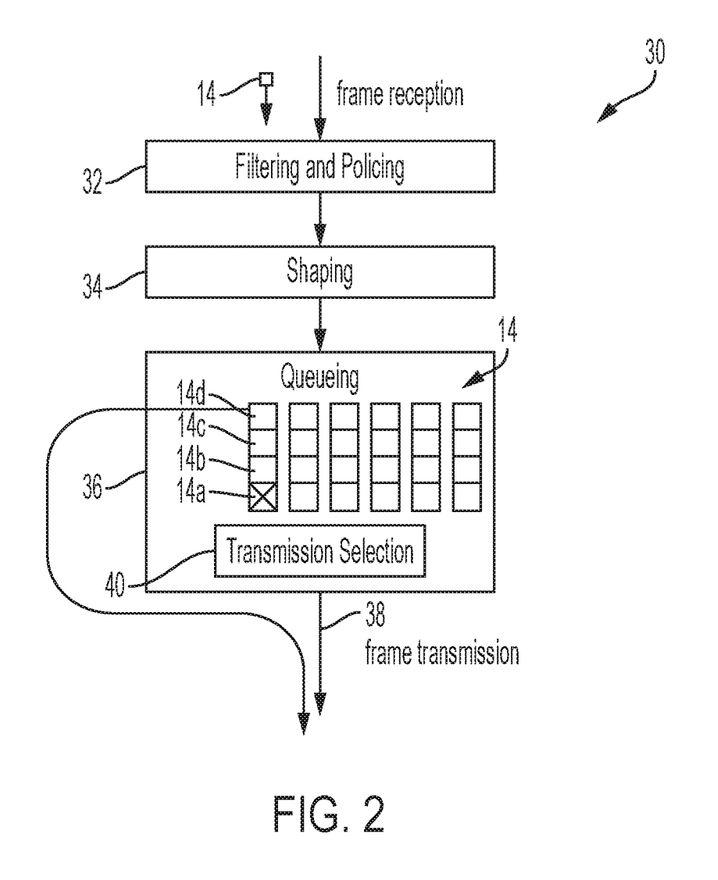
FIG. 2 illustrates an example prioritized deterministic transmission of a newest data packet of an identified flow of data packets, in place of another data packet of the identified flow and already queued for the deterministic transmission, according to an example embodiment.

As described previously, however, the replacement of multiple dedicated serial links with multiplexed connections 24 over a deterministic network 10 could result in buffering different identified flows of data packets together in a transmit queue 26, illustrated in FIG. 2; further, the deterministic requirements could allocate an improper priority to the oldest data packet in the transit queue (in order to enforce the guaranteed delivery of the oldest data packet within a bounded time).

A deterministic data network typically requires strict timing synchronization and scheduling along each hop from a source host to a destination host. A network manager (e.g., a TSN controller, scheduler, etc.) 22 within the deterministic data network can have a prescribed management domain (i.e., deterministic domain) for controlling each network device (e.g., 12) along the deterministic path, starting at the "ingress" switching device 12a transmitting the data packets 14 into the deterministic data network 10, continuing with each deterministic switching device (e.g., 12b, 12c) along the deterministic path, and ending with the "egress" deterministic switching device 12d at the end of the deterministic path. Hence, the network controller 22 can establish, for each deterministic data link 24 along a deterministic path, a scheduled transmit time for the corresponding transmitting deterministic network interface circuit, a scheduled receive time for the corresponding receiving deterministic network interface circuit, and a common time reference used for synchronization of each of the deterministic network devices in the deterministic domain. Deterministic networks can be used for industrial automation, vehicle control systems, and other systems that require precise delivery of control commands to a controlled device. However, implementing deterministic networking can include stringent deterministic constraints such as packet delivery within a prescribed latency, zero or near-zero jitter, high packet delivery ratios, etc.

As illustrated in FIG. 2, a deterministic device interface circuit 30 can be configured for executing various deterministic network operations, including ingress filtering and policing 32 of a received data packet 14 according to prescribed filtering policies and constraints (e.g., source address (IP/TCP/UDP, etc.), and/or destination address (IP/TCP/UDP, etc.)). For example, the ingress filtering and policing 32 can be configured for filtering (i.e., blocking) unrecognized source and/or destination addresses, and/or policing (blocking) identified flows that exceed a prescribed QoS constraint (e.g., a prescribed data rate, burst rate, etc.). A deterministic device interface circuit 30 also can be configured for executing traffic shaping 34, for example dropping selected newly-arrived data packets in response to detecting a buffer overflow condition in a transmit queue 36. The filtering and policing 32 and/or the traffic shaping 34 can be executed according to any one or more identified "stream" of an identified flow of data packets 14, and/or according to any QoS service class, etc. Hence, the filtering and policing 32 and traffic shaping 34 typically can be executed on a per-stream and/or per-class basis, etc. for an identified flow of data packets 14.

As illustrated in FIG. 2 and described in further detail below, a processor circuit 42 of a deterministic switching device 12 can cause the deterministic device interface circuit 30 to execute optimized deterministic transmission of the "newest" data packets (e.g., 14d) received by the deterministic switching device 12 (e.g., 12c) for an identified flow, for example in response to detecting congestion in the form of a previously-queued data packet 14a having associated with the same identified flow as the newest data packet 14d: the processor circuit 42 of the deterministic switching device 12 can cause the deterministic device interface circuit 30 to deterministically transmit, at a deterministic transmit instance 38 associated with the identified flow, the newest data packet 14d by a transmission selection operation 40 instead of (i.e., in place of) the queued data packet 14a (illustrated by the "X" over the queued data packet 14a), ensuring the next-hop device (e.g. 12d or 18) can receive the newest data packet (e.g., 14d). As described below, the newest data packet 14d can be prioritized over the queued data packet 14a, associated with the same identified flow of data packets, based on replacing (i.e., overwriting) the queued data packet 14a queued in the transmit queue 36 with the newest data packet 14d, enabling the newest data packet 14d to enjoy prioritized transmission at the deterministic transmit instance 38 enforced by the transmission selection operation 40.

The transmit queue 36 can include different queues for different classes of data packets, where the data packets 14a and 14d can be identified as part of a first flow "FLOW_ID=A" and allocated a first class, and data packets 14b and 14c can be identified as part of a second flow "FLOW_ID=B" and allocated the same first class but a different queue type (e.g., FIFO). Other data packets 14 in the transmit queue 36 can have respective prioritization requirements on a per-flow basis.

Hence, the example embodiments ensure that any buffering encountered by multiplexing different streams of data packets 14 into a switching device 12 does not delay transmission of the newest-received data packet (e.g., 14d) behind a queued data packet (e.g., 14a) associated with the same identified flow. The example embodiments provide a per-flow queue management of deterministic network switching devices in a deterministic network 10 that guarantees delivery of data packets within a bounded time, based on each deterministic network switching device 12 selectively prioritizing deterministic transmission, at a corresponding deterministic transmit instance 38 associated with an identified data flow, of the newest data packet received by the switching device and associated with the identified data flow. As described below, the selective prioritization can be executed based on detecting a prescribed congestion condition, for example based on determining the presence of a queued data packet associated with the same identified data flow (i.e., an instruction specifying one and only one data packet for an identified flow can be queued by the switching device), or based on determining the queued data packet has a queuing latency that exceeds a prescribed queuing latency for the identified flow.

Figure 3:
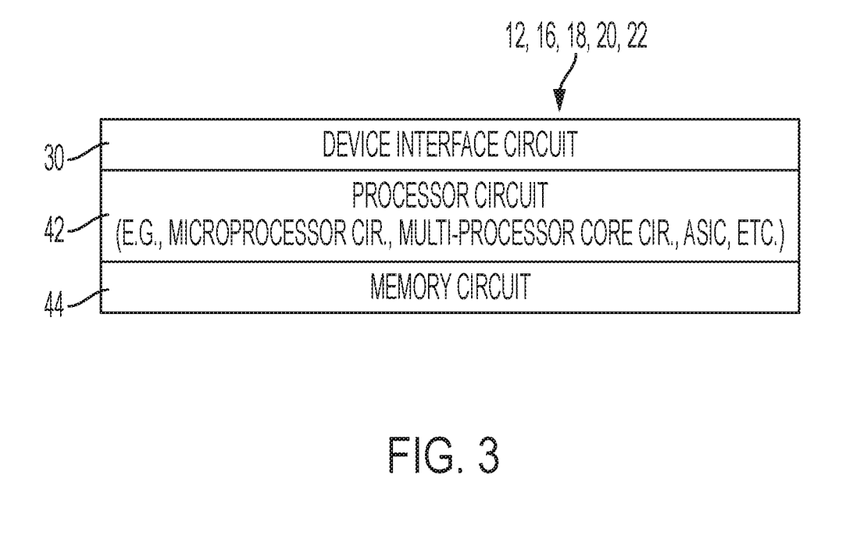
FIG. 3 illustrates an example implementation of any one of the devices of FIG. 1, according to an example embodiment.

FIG. 3 illustrates an example implementation of any one of the devices 12, 16, 18, 20, and/or 22 of FIG. 1, according to an example embodiment.

Each apparatus 12, 16, 18, 20, and/or 22 can include a device interface circuit 30, a processor circuit 42, and a memory circuit 44. The device interface circuit 30 can include one or more distinct physical layer transceivers for communication with any one of the other devices 12, 16, 18, 20, and/or 22; the device interface circuit 30 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein. In one embodiment, the transmit queue 36 can be implemented in the memory circuit 44 or the deterministic device interface circuit 30, as appropriate.

Any of the disclosed circuits of the devices 12, 16, 18, 20, and/or 22 (including the device interface circuit 30, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer or transmit queue). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
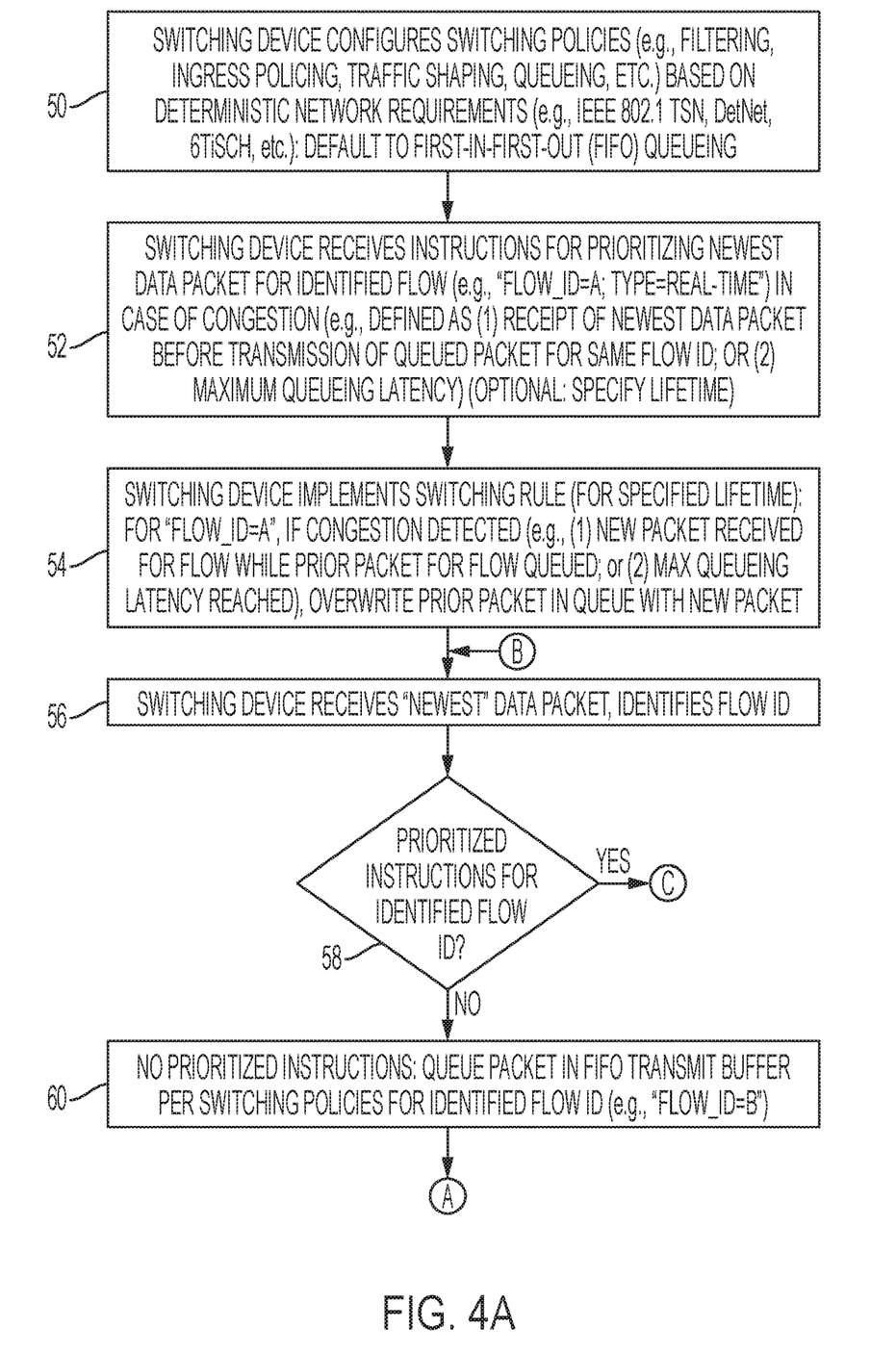
FIGS. 4A and 4B illustrate an example method of prioritizing a newest data packet of an identified flow for deterministic transmission at a deterministic transmit instance, instead of another data packet of the identified flow and already queued for the deterministic transmission, according to an example embodiment.
Figure 4B:
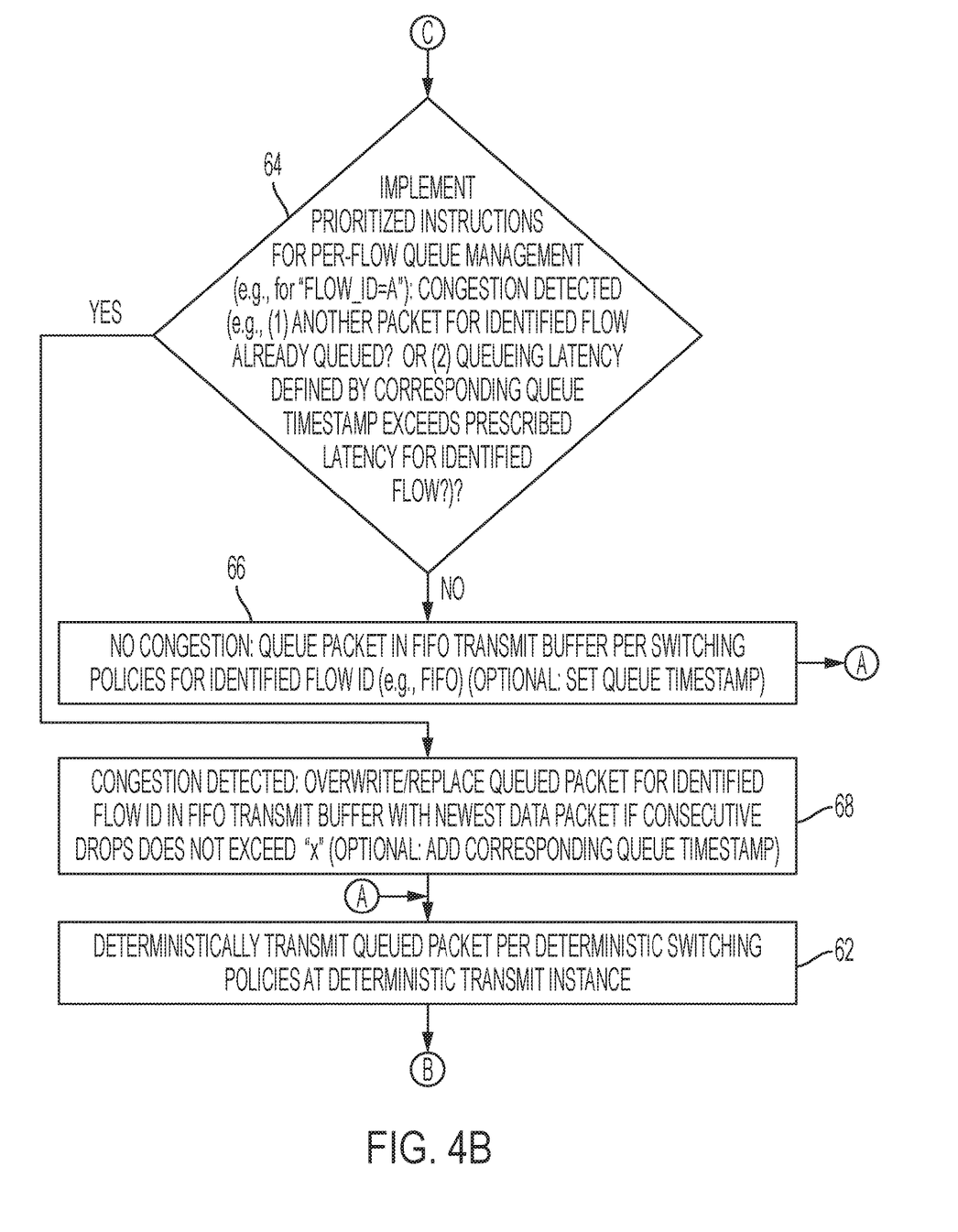

FIGS. 4A and 4B illustrate an example method of prioritizing a newest data packet of an identified flow for deterministic transmission at a deterministic transmit instance, instead of another data packet of the identified flow and already queued for the deterministic transmission, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 42 of any deterministic switching device 12 can configure in operation 50 its switching policies based on prescribed deterministic network requirements (e.g., parameters associated with executing any of the filtering and policing 32, traffic shaping 34, queuing operations associated with the transmit queue 36, and/or any transmission selection operation 40 executed by the deterministic device interface circuit 30) based on its associated deterministic device interface circuit 30 receiving instructions from another network device 12, 16, 18, 22, and/or 22. The processor circuit 42 of a deterministic switching device 12 can execute configuration of its switching policies (implementing network configuration information and user configuration policies) in response to received network configuration instructions. A deterministic switching device 12 can receive the network configuration instructions from the network configuration device 22 and/or the user configuration device 20 ("fully centralized"); the deterministic switching device 12 also can receive the network configuration instructions from a source device 16, a destination device 18, the network configuration device 22, and/or another network configuration device 22 ("centralized network and distributed user"); the deterministic switching device 12 also can receive the network configuration instructions from a next-hop network device along the path from the source device 16 to the destination device 18 (e.g., from the source device 16 for the deterministic switching device 12*a*; from another deterministic switching device 12 for the switching devices 12*b*, 12*c*, and/or 12*d*; and/or from the destination device 18 for the deterministic switching device 12*d*) ("fully distributed").

Hence, execution of operation 50 enables a deterministic switching device 12 to begin deterministic transmission of data packets along deterministic links 24 in the deterministic data network 10.

The deterministic device interface circuit 30 of any deterministic switching device 12 in operation 52 can receive queuing instructions associated with queuing an identified flow of data packets, for example queuing instructions for prioritizing a newest data packet for an identified flow (e.g., "FLOW_ID=A") of data packets 14. The instructions can specify the identified flow (e.g., "FLOW_ID=A"), the type of flow (e.g., "TYPE=REAL-TIME"; "TYPE=DETNET", "TYPE=TSN", "TYPE=AVB", "TYPE=TCP/IP", etc.), the associated queuing operation to be performed (e.g., prioritize always, prioritize in case of congestion, FIFO always, etc.), and/or the method of determining the congestion (e.g., packet of same identified flow already queued; queuing latency for queued packet exceeds maximum queuing latency, etc.). The instructions also can specify a method or identifying the flow of data packets (e.g., "FLOW_A" identified based on source/destination address pair (IP/TCP/UDP, etc.)). The instructions also can specify a lifetime value associated with an expected lifetime of the identified flow of data packets (e.g., expected lifetime of the source device 16 generating and outputting the identified flow of data packets for a given application session with a destination device 18). As described previously, the queuing instructions can be received, on a per-flow basis, based on any one of a "fully centralized" implementation, a "centralized network and distributed user" implementation, and/or a "fully distributed" implementation in the deterministic data network 10.

The processor circuit 42 of a deterministic switching device 12 in operation 54 can implement switching rules (e.g., stored in the memory circuit 44) for the identified flow (e.g., "FLOW_ID=A"), where the switching rule can specify the identified flow (e.g., "FLOW_ID=A"), the switching rule condition (e.g., for every received packet of the identified flow, if congestion detected) and any associated definition, and associated action. As illustrated in operation 54 of FIG. 4A, the switching rule can define the conditions for congestion detection, for example: (1) if a newest data packet 14*d* is received while a prior packet 14*a* of the same identified flow is queued in the transmit queue 36; or (2) if the prior packet 14*a* queued in the transmit queue 36 has exceed a prescribed maximum queuing latency. The switching rule also can specify the associated switching/queuing action to be performed, e.g., overwrite the queued data packet 14*a* stored in the transmit queue 36 with the newest data packet 14*d* to enable the deterministic transmission of the newest data packet 14*d* at the deterministic transmit instance 38 that was previously allocated to the queued data packet 14*a*.

Operations 52 and 54 can be repeated for any number of identified flows that are to be transported from a source device 16 to a destination device 18 via a deterministic path established by the deterministic switching devices 12 in the deterministic data network 10. Hence, each deterministic switching device 12 can selectively prioritize, for a plurality of identified flows of data packets, identified newest data packets based on respective instructions for the identified flows, where the instructions received in operation 52 for the different identified flows can cause the switching device to execute per-flow queue management, described below, for selective prioritization of a corresponding identified newest data packet.

The per-flow queue management also can include queuing non-deterministic flows (e.g., TCP/IP flows) having lower QoS requirements that do not require a guaranteed delivery within a bounded time; hence, the transmission selection operation 40 in the deterministic device interface circuit 30 of a deterministic switching device 12 can prioritize deterministic classes of identified flows of data packets 14 over other non-deterministic classes of identified flows of data packets.

The deterministic device interface circuit 30 of a deterministic switching device 12 (e.g. 12*a*) in operation 56 can receive a "newest" data packet 14. The deterministic device interface circuit 30 and/or the processor circuit 42 in operation 56 can identify the flow (e.g., "FLOW_B" identified based on parsing source/destination address pair (IP/TCP/UDP, etc. of received data packet 14), and in response accessing the corresponding switching rule.

If in operation 58 the processor circuit 42 and/or the deterministic device interface circuit 30 of the deterministic switching device 12 determines there are no prioritized instructions specified in a corresponding switching rule for the identified flow (e.g., "FLOW_B" has no prioritized instructions specified in its switching rule), the processor circuit 42 and/or the deterministic device interface circuit 30 of the deterministic switching device 12 in operation 60 can execute a default operation (e.g., FIFO queuing) and queue the received data packet 14 in its transmit queue 36, for deterministic transmission in operation 62 of FIG. 4B of the queued data packet (e.g., 12*b*, 12*c*) at its deterministic transmit instance 38 according to prescribed QoS class policies for the associated identified flow (e.g., "FLOW_B"). Processing can continue for the next received data packet 14 in operation 56.

In response to the deterministic device interface circuit 30 of a deterministic switching device 12 receiving a data packet 14 in operation 56, the processor circuit 42 and/or the deterministic device interface circuit 30 of the deterministic switching device 12 in operation 58 can determine that prioritized instructions are specified in a corresponding switching rule for the identified flow (e.g., "FLOW_A" specifies prioritization in case of congestion). Hence, the processor circuit 42 and/or the deterministic device interface circuit 30 of the deterministic switching device 12 in operation 64 of FIG. 4B can implement the prioritized instructions for the per-flow queue management (e.g., for "FLOW_A") for the received data packet (e.g., 14*a*). The processor circuit 42 and/or the deterministic device interface circuit 30 of the deterministic switching device 12 (e.g., 12*a*) in operation 64 can determine whether any congestion is detected in the transmit queue 36 for the identified flow (e.g., for "FLOW_A"). As illustrated in operation 64 and as described previously, the congestion can be defined in the corresponding prioritized instruction as one of: (1) if a data packet 14 is received while a prior packet 14 of the same identified flow is queued in the transmit queue 36; or (2) if the prior packet 14 queued in the transmit queue 36 has exceed a prescribed maximum queuing latency (e.g., specified in the prioritized instructions).

If in operation 64 the processor circuit 42 and/or the deterministic device interface circuit 30 of the deterministic switching device 12 determines no congestion is encountered (e.g., there is no other data packet 14 in the transmit queue 36 that is associated with the identified flow (e.g., "FLOW_A")), the processor circuit 42 and/or the deterministic device interface circuit 30 of the deterministic switching device 12 in operation 66 can queue the received data packet 14 in the transmit queue 36 for FIFO-based queuing while waiting for the deterministic transmission in operation 62 according to the deterministic transmit instance 38 associated with the identified flow. In one embodiment, the received data packet 14 can be stored in the transmit queue 36 with an associated queue timestamp that enables later determination of a queue latency for the queued data packet.

Hence, the deterministic device interface circuit 30 of the deterministic switching device 12 (e.g., 12a) can deterministically output the queued data packet (e.g., 14a) in operation 62 at the corresponding deterministic transmit instance 38. As illustrated in FIG. 1, each of the deterministic switching devices 12a and 12b can repeat the above-described operations 56, 58, 64, 66, and 62 for the data packet 14a and data packet 14b associated with the same identified flow (e.g., "FLOW_A"), based on each determining in operation 66 that there is no congestion, e.g., each deterministic switching device 12a and 12b can deterministically output the queued data packet 14a before reception of the data packet 14b.

In contrast, assume that the deterministic switching device 12c encounters some form of "congestion", for example where the deterministic switching device 12c is unable to deterministically transmit the queued data packet 14a before reception of the newest data packet 14d in operation 56. Hence, the deterministic switching device 12c can queue in operation 66 the first received data packet 14a and receive in operation 56 the newest data packet 14d associated with the same flow "FLOW_A" while the queued data packet 14a is still queued in the transmit queue 36 of the deterministic switching device 12c.

The processor circuit 42 and/or deterministic device interface circuit 30 of the deterministic switching device 12c in operation 64 can execute the prioritized instructions in response to receiving the newest data packet 14d based on determining the identified flow "FLOW_A" is encountering a prescribed congestion in the transmit queue 36: in one embodiment, the processor circuit 42 and/or the deterministic device interface circuit 30 of the deterministic switching device 12c in operation 64 can detect the congestion based on identifying the queued data packet 14a (associated with the same identified flow "FLOW_A") is already queued in the transmit queue 36; alternately, the processor circuit 42 and/or the deterministic device interface circuit 30 of the deterministic switching device 12c in operation 64 an determine that the queuing latency of the queued data packet 14a (determined by its corresponding queue timestamp relative to the current internal clock value in the deterministic switching device 12c) exceeds a prescribed latency for the identified flow "FLOW_A".

In response to detecting the congestion in operation 64, the processor circuit 42 and/or the deterministic device interface circuit 30 of the deterministic switching device 12c in operation 68 can prioritize the newest data packet 14d based on causing the deterministic device interface circuit 30 to deterministically transmit in operation 62, at the deterministic transmit instance 38, the newest data packet 14d instead of (i.e., in place of) the queued data packet 14a. For example, the processor circuit 42 and/or the deterministic device interface circuit 30 of the deterministic switching device 12c in operation 68 can overwrite/replace the queued data packet 14a with the newest data packet 14d in the transmit queue 36, and optionally update the corresponding queue timestamp for the newest data packet 14d stored in the transmit queue 36. Hence, as illustrated in FIG. 1, the deterministic device interface circuit 30 of the deterministic switching device 12c can execute the transmission selection operation 40 in operation 62 based on deterministically transmitting the newest data packet 14d at the deterministic transmit instance 38 that was previously allocated for the queued data packet 14a of the identified flow "FLOW_A". Hence, the deterministic switching device 12d can deterministically transmit the newest-available newest data packet 14d to the destination device 18 for processing.

According to example embodiments, a new data packet can be prioritized over a queued data packet, guaranteeing deterministic transmission of the newest data packet to a destination device. As illustrated in operation 68, the example embodiments enable a switching device 12 to drop up to "x" number of consecutive packets 14 in an identified flow, for example based on the prioritized instructions generated for the identified flow (e.g., by a source device 16 and/or destination device 18) and received by the switching device 12. Hence, a deterministic switching device 12 can track consecutive packet drops for an identified flow based on tracking sequence counter values in each data packet 14 that is dropped for an identified flow; hence, if the number of consecutive packet drops exceeds the prescribed consecutive drop amount "x", the processor circuit 42 and/or the deterministic device interface circuit 30 of the deterministic switching device 12c can execute more aggressive congestion mitigation, including discarding non-deterministic packets from the transmit queue 36, sending an alert to a destination device 18 or the network configuration device 22, etc., without dropping the next queued packet that would exceed the "x" number of consecutive packet drops.

Hence, the example embodiments enable distributed congestion management on a per-flow basis in a deterministic data network 10, where the deterministic switching devices 12 can independently manage congestion based on prescribed rules for an identified flow, including ensuring support of "real-time" applications that require delivery of the newest data packet as a priority over aged data packets encountering congestion. The example embodiments also enable distributed congestion management (on a per-flow basis) for non-real time data flows, where data packets encountering an excessive queuing latency can be dropped and replaced with the newest data packet received by the deterministic switching device 12 for the corresponding identified flow. If desired, associated counters regarding dropped packets can be sent by a switching device to the network configuration device 22, for reporting of congestion conditions in the deterministic network 10 that may require corrective action.

Variations also can be included to accommodate more than a single message in a transmit queue for an identified data flow. In one example, a switching device can be implemented to queue multiple data packets for an identified data flow from a source device that is not DetNet aware and that generates a burst of data packets (e.g., 10 packets); in such a case, the switching device can be configured to accept a maximum of ten (10) packets in its transmit queue, with a maximum queuing latency of 200 milliseconds (ms). Hence, if the switching device determines the oldest message ("number 10") for the identified flow in the transmit queue exceeds the 200 ms maximum queuing latency, the switching device can discard the oldest message ("number 10") and prioritize the next-oldest message ("number 9") as taking the corresponding position in the transmit queue of the discarded message ("number 10"), allocating the next message ("number 8") as taking the corresponding position in the transmit queue of the "pushed" message ("number 9"), etc., such that the maximum number of ten packets in the transmit queue is preserved, as well as the positions gained by the newer packets in the transmit queue. Further, the first "pushed" message ("number 9") can be marked for preservation to ensure consecutive packets are not dropped.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a switching device in a deterministic network, a first data packet associated with an identified flow of data packets, and queuing the first data packet for deterministic transmission at a deterministic transmit instance to a next-hop device in the deterministic network;
detecting, by the switching device, reception of a newest data packet associated with the identified flow and before the deterministic transmission of the first data packet;
prioritizing for the identified flow, by the switching device, the newest data packet based on deterministically transmitting, at the deterministic transmit instance, the newest data packet instead of the first data packet;
receiving, by the switching device, an instruction for the prioritizing the newest data packet for the identified flow in case of congestion; and
detecting, by the switching device, the congestion based on reception of the newest data packet before the deterministic transmission of the first data packet by the switching device;
the switching device executing the prioritizing in response to the congestion based on the instruction for the identified flow.

2. The method of claim 1, further comprising:
receiving, by the switching device, a second identified flow of data packets; and
deterministically transmitting, at respective deterministic transmit instances, the second identified flow of data packets according to a prescribed First-in-First-Out (FIFO) sequence, based on an absence of any instruction for prioritizing any data packet in the second identified flow.

3. The method of claim 1, wherein the instruction for the prioritizing indicates the identified flow is a real-time flow for a destination device.

4. The method of claim 1, further comprising selectively prioritizing, for a plurality of identified flows of data packets, identified newest data packets based on respective instructions for the identified flows, the instructions causing the switching device to execute per-flow queue management for selective prioritization of the corresponding identified newest data packet.

5. The method of claim 1, wherein the prioritizing includes selectively replacing the first data packet queued in a transmit queue, with the newest data packet, based on determining a consecutive number of dropped data packets in the identified flow is less than a prescribed threshold.

6. The method of claim 1, wherein the prioritizing includes prioritizing the newest data packet for the identified flow based on determining a queuing latency for the first data packet exceeds a prescribed latency set for the identified flow.

7. An apparatus implemented as a physical machine, the apparatus comprising:
non-transitory machine readable media configured for storing executable machine readable code and further comprising a queue for received data packets;
a device interface circuit configured for receiving a first data packet associated with an identified flow of data packets in a deterministic network; and
a processor circuit configured for executing the machine readable code, and when executing the machine readable code operable for:
queuing the first data packet in the queue for deterministic transmission at a deterministic transmit instance to a next-hop device in the deterministic network,
detecting reception of a newest data packet associated with the identified flow and before the deterministic transmission of the first data packet,
prioritizing for the identified flow the newest data packet based on causing the device interface circuit to deterministically transmit, at the deterministic transmit instance, the newest data packet instead of the first data packet, wherein:
the device interface circuit is configured for receiving an instruction for the prioritizing the newest data packet for the identified flow in case of congestion;
the processor circuit is configured for detecting the congestion based on reception of the newest data packet before the deterministic transmission of the first data packet by the device interface circuit;
the processor circuit is configured for executing the prioritizing in response to the congestion based on the instruction for the identified flow.

8. The apparatus of claim 7, wherein:
the device interface circuit is configured for receiving a second identified flow of data packets; and
the processor circuit is configured for causing the device interface circuit to deterministically transmit, at respective deterministic transmit instances, the second identified flow of data packets according to a prescribed First-in-First-Out (FIFO) sequence, based on an absence of any instruction for prioritizing any data packet in the second identified flow.

9. The apparatus of claim 7, wherein the instruction for the prioritizing indicates the identified flow is a real-time flow for a destination device.

10. The apparatus of claim 7, wherein the processor circuit is configured for selectively prioritizing, for a plurality of identified flows of data packets, identified newest data packets based on respective instructions for the identified flows, the instructions causing the processor circuit to execute per-flow queue management for selective prioritization of the corresponding identified newest data packet.

11. The apparatus of claim 7, wherein the processor circuit is configured for selectively replacing the first data packet queued in the queue, with the newest data packet, based on determining a consecutive number of dropped data packets in the identified flow is less than a prescribed threshold.

12. The apparatus of claim 7, wherein the processor circuit is configured for prioritizing the newest data packet for the identified flow based on determining a queuing latency for the first data packet exceeds a prescribed latency set for the identified flow.

13. One or more non-transitory tangible media encoded with logic for execution by a machine and when executed by the machine operable for:

receiving, by the machine implemented as a switching device in a deterministic network, a first data packet associated with an identified flow of data packets, and queuing the first data packet for deterministic transmission at a deterministic transmit instance to a next-hop device in the deterministic network;

detecting reception of a newest data packet associated with the identified flow and before the deterministic transmission of the first data packet;

prioritizing, for the identified flow, the newest data packet based on deterministically transmitting, at the deterministic transmit instance, the newest data packet instead of the first data packet;

receiving an instruction for the prioritizing the newest data packet for the identified flow in case of congestion; and detecting the congestion based on reception of the newest data packet before the deterministic transmission of the first data packet by the switching device;

the switching device executing the prioritizing in response to the congestion based on the instruction for the identified flow.

14. The one or more non-transitory tangible media of claim 13, wherein the instruction for the prioritizing indicates the identified flow is a real-time flow for a destination device.

15. The one or more non-transitory tangible media of claim 13, further operable for selectively prioritizing, for a plurality of identified flows of data packets, identified newest data packets based on respective instructions for the identified flows, the instructions causing the switching device to execute per-flow queue management for selective prioritization of the corresponding identified newest data packet.

16. The one or more non-transitory tangible media of claim 13, wherein the prioritizing includes selectively replacing the first data packet queued in a transmit queue, with the newest data packet, based on determining a consecutive number of dropped data packets in the identified flow is less than a prescribed threshold.

17. The one or more non-transitory tangible media of claim 13, wherein the prioritizing includes prioritizing the newest data packet for the identified flow based on determining a queuing latency for the first data packet exceeds a prescribed latency set for the identified flow.

18. The one or more non-transitory tangible media of claim 13, further operable for:

receiving, by the switching device, a second identified flow of data packets; and deterministically transmitting, at respective deterministic transmit instances, the second identified flow of data packets according to a prescribed First-in-First-Out (FIFO) sequence, based on an absence of any instruction for prioritizing any data packet in the second identified flow.

* * * * *